United States Patent
Shiao et al.

(10) Patent No.: US 11,188,132 B2
(45) Date of Patent: Nov. 30, 2021

(54) MODULAR POWER DELIVERY TECHNIQUES FOR ELECTRONIC DEVICES

(71) Applicant: INTEL CORPORATION, Santa Clara, CA (US)

(72) Inventors: Yu Liang Shiao, Taipei (TW); Tawfik M. Rahal-Arabi, Tigard, OR (US); Chang-Wu Yen, Taipei (TW); Celia H. Yang, Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 975 days.

(21) Appl. No.: 15/169,350

(22) Filed: May 31, 2016

(65) Prior Publication Data

US 2017/0344086 A1 Nov. 30, 2017

(51) Int. Cl.
 *G06F 1/26* (2006.01)
 *G05F 3/02* (2006.01)
 *G06F 1/28* (2006.01)

(52) U.S. Cl.
 CPC ............... *G06F 1/266* (2013.01); *G05F 3/02* (2013.01); *G06F 1/263* (2013.01); *G06F 1/28* (2013.01)

(58) Field of Classification Search
 CPC ..................................................... G06F 1/266
 See application file for complete search history.

(56) References Cited

U.S. PATENT DOCUMENTS

| | | | | |
|---|---|---|---|---|
| 5,884,049 A * | 3/1999 | Atkinson | ............... | G06F 1/1632 361/679.41 |
| 2001/0003205 A1* | 6/2001 | Gilbert | .................... | G06F 1/266 713/320 |
| 2013/0020875 A1 | 1/2013 | Wozniak et al. | | |
| 2014/0184143 A1* | 7/2014 | Coakley | .................... | H02J 4/00 320/107 |
| 2014/0191033 A1* | 7/2014 | Wojcik | ................... | G06K 7/082 235/449 |
| 2015/0244185 A1* | 8/2015 | Won | ........................ | G06F 1/266 320/103 |

OTHER PUBLICATIONS

Written Opinion received for PCT Patent Application No. PCT/US2017/033349, dated Aug. 29, 2017, 8 pages.

* cited by examiner

*Primary Examiner* — Kim Huynh
*Assistant Examiner* — Joshua Neveln
(74) *Attorney, Agent, or Firm* — Kacvinsky Daisak Bluni PLLC

(57) ABSTRACT

Modular power delivery techniques for electronic devices are described. In one embodiment, an apparatus may comprise native power delivery circuitry to source a native power delivery current, power management circuitry to control the native power delivery circuitry, a power delivery connector to mate with a counterpart power delivery connector of an external device, and a processing device conductively coupled to the power delivery connector via a supplemental power delivery line, the processing device to draw a supplemental power delivery current from the external device via the supplemental power delivery line. Other embodiments are described and claimed.

16 Claims, 10 Drawing Sheets

MODULAR POWER DELIVERY TECHNIQUES FOR ELECTRONIC DEVICES

TECHNICAL FIELD

Embodiments herein generally relate to voltage regulation and power management.

BACKGROUND

A processor or system-on-a-chip (SoC) comprised in a given electronic device may operate using power provided by power delivery circuitry of that electronic device. Such power delivery circuitry may provide such power by sourcing power delivery current. The more power delivery current that the power delivery circuitry is capable of sourcing, the more power it may be capable of delivering. The amount of power delivery current that the power delivery circuitry is capable of sourcing may depend on its design. A basic power delivery solution may be inexpensive and compact, but its power delivery limitations may potentially impose significant constraints on performance. A robust power delivery solution may be implemented so that performance is unfettered by such power delivery limitations, but may be significantly more expensive and/or significantly larger than a basic power delivery solution.

BRIEF DESCRIPTION OF THE DRAWINGS

FIG. 2 illustrates an embodiment of an apparatus having a power deliver module slot.

FIG. 3 illustrates an embodiment of the apparatus of FIG. 2 and a power delivery module inserted in the slot.

DETAILED DESCRIPTION

Various embodiments may be generally directed to modular power delivery techniques for electronic devices. In one embodiment, an apparatus may comprise native power delivery circuitry to source a native power delivery current, power management circuitry to control the native power delivery circuitry, a power delivery connector to mate with a counterpart power delivery connector of an external device, and a processing device conductively coupled to the power delivery connector via a supplemental power delivery line, the processing device to draw a supplemental power delivery current from the external device via the supplemental power delivery line. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
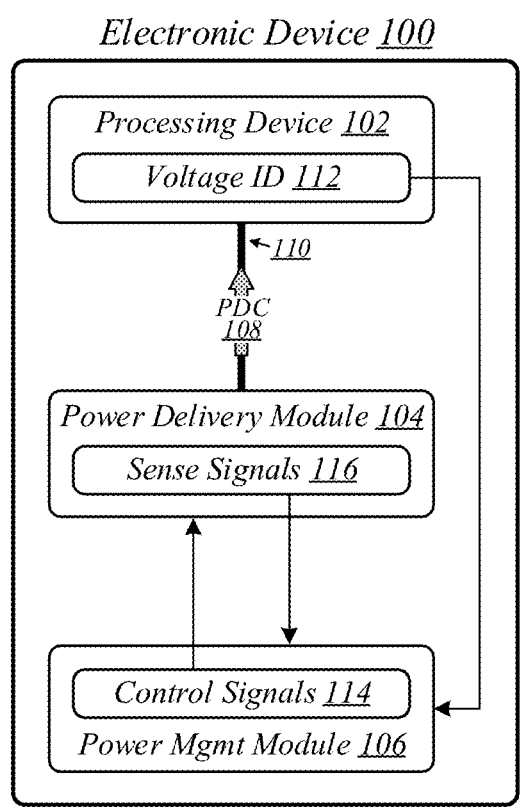
FIG. 1 illustrates an embodiment of an electronic device.

FIG. 1 illustrates an electronic device 100. As shown in FIG. 1, electronic device 100 may comprise a processing device 102, a power delivery module 104, and a power management module 106. Processing device 102 may generally comprise an electronic device that features processing circuitry/capabilities, such as a processor or system-on-a-chip (SoC). Power delivery module 104 may generally comprise circuitry configured to provide power to processing device 102 by sourcing a power delivery current (PDC) 108. In various embodiments, processing device 102 may draw power delivery current 108 via a power delivery line 110. Power management module 106 may generally be operative to regulate an input voltage of processing device 102. In some embodiments, power management module 106 may read a voltage identifier (ID) 112 from voltage ID pins of processing device 102 in order to identify a required voltage level and regulate the input voltage of processing device 102 to maintain it at (at least approximately) the required voltage level. In various embodiments, power management module 106 may be operative to regulate the input voltage of processing device 102 by controlling power delivery module 104. In some embodiments, power management module 106 may be operative to control power delivery module 104 by sending control signals 114 to power delivery module 104. In various embodiments, power management module 106 may be operative to monitor the input voltage level of processing device 102 based on sense signals 116 received from/via power delivery module 104. The embodiments are not limited in this context.

In some embodiments, power delivery current 108 may generally increase as the amount of power being delivered to processing device 102 increases. In various embodiments, power delivery module 104 may be capable of sourcing up to a maximum amount $PDC_{max}$ of power delivery current. In some embodiments, the value of $PDC_{max}$ may potentially constitute a limiting factor with respect to the amount of power that can be delivered to processing device 102. In various embodiments, processing device 102 may be able to accept/use up to a maximum amount $I_{max}$ of power delivery current. In some embodiments, if $PDC_{max}$ is less than $I_{max}$, then the maximum amount of power that power delivery module 104 can actually deliver may be less than the maximum amount of power that processing device 102 can use.

In various embodiments, such a constraint on the amount of power that can be provided to processing device 102 may also constitute a constraint on the performance of processing device 102. In some embodiments, when $PDC_{max}$ is less than $I_{max}$, some higher-performance operational states may be unavailable to processing device 102 due to the unavailability of sufficient power delivery current to enable satisfaction of the power requirements associated with such higher-performance operational states. For example, processing device 102 may not be able to operate in a higher-performance state requiring a 24 A power delivery current if power delivery module 104 can source no more than 12 A of power delivery current.

In various embodiments, in order to make higher-performance operational states available to processing device 102, power delivery module 104 may be designed such that $PDC_{max}$ is greater than or equal to $I_{max}$. However, this may require the use of more expensive components in implementing power delivery module 104, and thus increase the cost of electronic device 100. Such a tradeoff may be unappealing from the perspective of potential consumers for whom high-end performance is not a priority. On the other hand, the performance limitations associated with using a lower cost power delivery module 104 may render electronic device 100 unappealing to "power users" for whom high-end performance is a major priority. As such, regardless of whether power delivery module 104 is designed to provide robust current sourcing capabilities or merely basic ones, processing device 102 may be suboptimal for at least some consumers with respect to cost, performance, or both. Designing power delivery module 104 to support a larger $PDC_{max}$ may also cause power delivery module 104 to occupy more space, potentially resulting in an increase in the overall size of electronic device 100. Such a size increase may reduce the appeal of electronic device 100 from the perspective of consumers that prefer compact devices.

Disclosed herein are modular power delivery techniques that may be implemented in some embodiments in order to enable a user of an electronic device to select a cost/size vs. performance tradeoff that is appropriate for his/her particular needs. According to various such techniques, an electronic device may be designed such that a processing device of the electronic device can draw current from a non-native power delivery module. In some embodiments, the current-sourcing capacity of the non-native power delivery module may supplement current-sourcing capacity of a native/built-in power delivery module of the electronic device. In various other embodiments, the electronic device may not feature a native/built-in power delivery module, and all of the power delivery current drawn by the processing device may be sourced by the non-native power delivery module. In some embodiments, the non-native power delivery module may be inserted into a slot or other type of receptacle of the electronic device in order to directly link power circuitry of the non-native power delivery module with power circuitry of the electronic device. In various other embodiments, the non-native power delivery module may be inserted into a slot or other type of receptacle of an intermediate device such as a docking station, and connecting the electronic device with the intermediate device may enable the electronic device to make use of the current-sourcing capabilities of the non-native power delivery module. The embodiments are not limited in this context.

Figure 2:
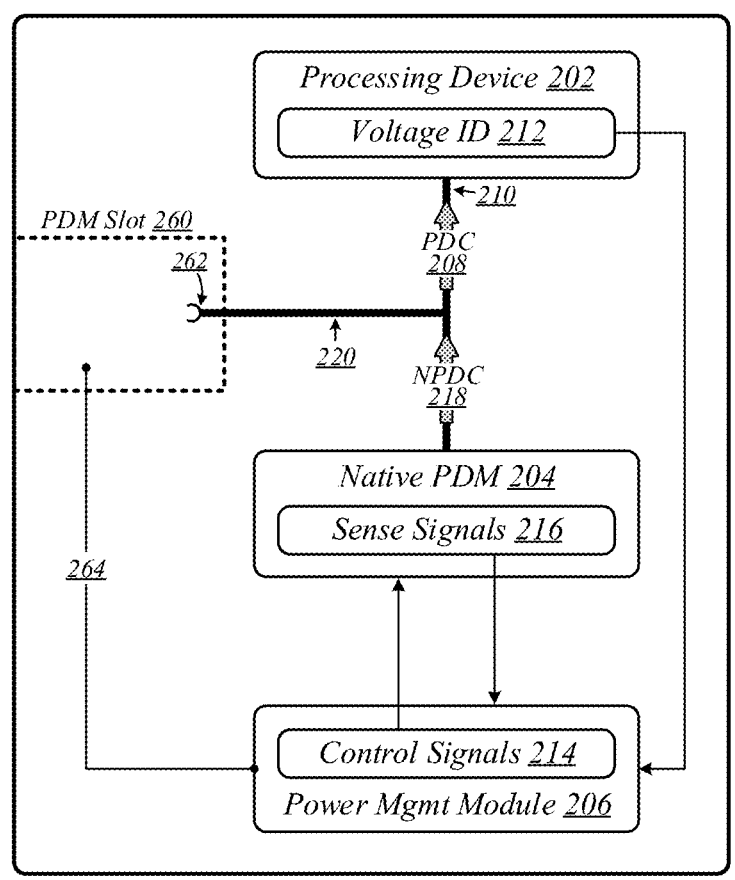
FIG. 2 illustrates an embodiment of a first apparatus.

FIG. 2 illustrates an apparatus 200 that may be representative of the implementation of one or more of the disclosed modular power delivery techniques according to some embodiments. Apparatus 200 may generally be representative of an electronic device. In various embodiments, apparatus 200 may be representative of a mobile communication device, such as a mobile phone. In some other embodiments, apparatus 200 may be representative of a portable computing device, such as a laptop computer, tablet computer, "2-in-1" laptop-tablet hybrid, or another type of portable computing device. In still other embodiments, apparatus 200 may be representative of another type of computing device, such as a desktop computer or a workstation. In yet further embodiments, apparatus 200 may be representative of an electronic device of another type, such as a gaming console, a digital camera, a media player, or a television, or may be representative of a home appliance. The embodiments are not limited to these examples.

As shown in FIG. 2, apparatus 200 may comprise a processing device 202, a native power delivery module (PDM) 204, a power management module 206, and a PDM slot 260. Processing device 202 may generally comprise an electronic device, such as an integrated circuit, that features processing circuitry/capabilities. In various embodiments, processing device 202 may draw power delivery current 208 from a power delivery line 210. In some embodiments, processing device 202 may comprise a processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core or quad-core processor or dual-core or quad-core mobile processor, or any other microprocessor or central processing unit (CPU). In various such embodiments, processing device 202 may comprise a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some other embodiments, processing device 202 may comprise an SoC, or another type of device featuring processing circuitry/capabilities. The embodiments are not limited in this context.

Native power delivery module 204 may generally comprise built-in circuitry of apparatus 200. In various embodiments, native power delivery module 204 may comprise circuitry configured to provide power to processing device 202 by sourcing a native power delivery current (NPDC) 218. In some embodiments, native power delivery module 204 may comprise one or more metal-oxide-semiconductor field-effect transistors (MOSFETs), one or more MOSFET drivers, one or more inductors such as a chokes, and one or more capacitors. It is to be appreciated that native power delivery module 204 may additionally or alternatively comprise one or more other components in various embodiments, and the embodiments are not limited to this example.

Power management module 206 may generally be operative to regulate an input voltage of processing device 202. In some embodiments, power management module 206 may comprise a voltage regulator controller. In various embodiments, power management module 206 may comprise a power management integrated circuit (PMIC). In some embodiments, power management module 206 may be operative to read a voltage identifier (ID) 212 from voltage ID pins of processing device 202 in order to identify a required voltage level and regulate the input voltage of processing device 202 to maintain it at (at least approximately) the required voltage level. In various embodiments, power management module 206 may be operative to monitor the input voltage level of processing device 202 based on sense signals 216 received from/via native power delivery module 204.

In some embodiments, the behavior of processing device 202 during ongoing operation may generally depend on one or more operating parameter settings of processing device 202. In various embodiments, the one or more operating parameter settings may include a power delivery load line setting, which may be set to substantially match a load line of the power delivery circuitry that powers processing device 202. In some embodiments, the one or more operating parameter settings may include a power delivery current limit setting, which may be set to designate a limit on the amount of power delivery current that processing device 202 is to draw. In various embodiments, the one or more operating parameter setting may include a power consumption limit setting, which may be set to designate a limit on the operating power of processing device 202. In some such embodiments, the power consumption limit setting may be set to designate a highest available/permissible power state for processing device 202. The embodiments are not limited to these examples.

In various embodiments, the aforementioned one or more operating parameter settings may include one or more dynamically programmable operating parameter settings. In some embodiments, processing device 202 may feature a dynamically programmable power delivery load line setting. In various embodiments, processing device 202 may feature a dynamically programmable power delivery current limit setting. In some embodiments, processing device 202 may feature a dynamically programmable power consumption limit setting. The embodiments are not limited to these examples.

PDM slot 260 may generally comprise a slot, port, receptacle, coupling, interface, or other feature designed to accept a supplemental power delivery module capable of providing processing device 202 with additional power to supplement that provided by native power delivery module 204. In various embodiments, in conjunction with providing processing device 202 with additional power, such a supplemental power delivery module may source additional power delivery current to supplement the native power delivery current 218 sourced by native power delivery module 204.

In some embodiments, apparatus 200 may comprise a power delivery connector 262. In various embodiments, power delivery connector 262 may be designed/situated in such fashion that when a supplemental power delivery module is inserted into PDM slot 260, power delivery connector 262 mates with a counterpart power delivery connector of the supplemental power delivery module. In some embodiments, power delivery connector 262 may be conductively coupled with power delivery line 210 via a supplemental power delivery line 220. In various embodiments, apparatus 200 may comprise a supplemental control line 264. In some embodiments, supplemental control line 264 may be designed/situated in such fashion that when a supplemental power delivery module is inserted into PDM slot 260, power management module 206 can send control signals to the supplemental power delivery module via supplemental control line 264. The embodiments are not limited in this context.

In various embodiments, when no supplemental power delivery module is present in PDM slot 260, all of the power delivery current 208 drawn by processing device 202 may be sourced by native power delivery module 204, such that power delivery current 208 is the same as native power delivery current 218. In some embodiments, when no supplemental power delivery module is present in PDM slot 260, power management module 206 may be operative to regulate the input voltage of processing device 202 by controlling native power delivery module 204 using control signals 214 that it sends to native power delivery module 204. In various embodiments, when no supplemental power delivery module is present in PDM slot 260, a power delivery load line setting for processing device 202 may be set to substantially match a load line of native power delivery module 204. In some embodiments, when no supplemental power delivery module is present in PDM slot 260, a power delivery current limit setting for processing device 202 may be set based on the amount of power delivery current that can be sourced by native power delivery module 204. In various embodiments, when no supplemental power delivery module is present in PDM slot 260, a power consumption limit setting for processing device 202 may be set based on the amount of power that can be delivered by native power delivery module 204. The embodiments are not limited in this context.

In some embodiments, native power delivery module 204 may be capable of sourcing up to a maximum amount $NPDC_{max}$ of power delivery current, and processing device 202 may be able to accept/use up to a maximum amount $I_{max}$ of power delivery current. In various embodiments, native power delivery module 204 may be designed to provide relatively basic current-sourcing capabilities, and $NPDC_{max}$ may thus be relatively low. In some embodiments, native power delivery module 204 may comprise power delivery circuitry for only a single power phase. In various embodiments, $NPDC_{max}$ may be less than $I_{max}$, such that the maximum amount of power that native power delivery module 204 is capable of delivering is less than the maximum amount of power that processing device 202 can use. In some embodiments, some higher-performance operational states may therefore be unavailable to processing device 202 when it can draw power delivery current only from native power delivery module 204. The embodiments are not limited in this context.

Figure 3:
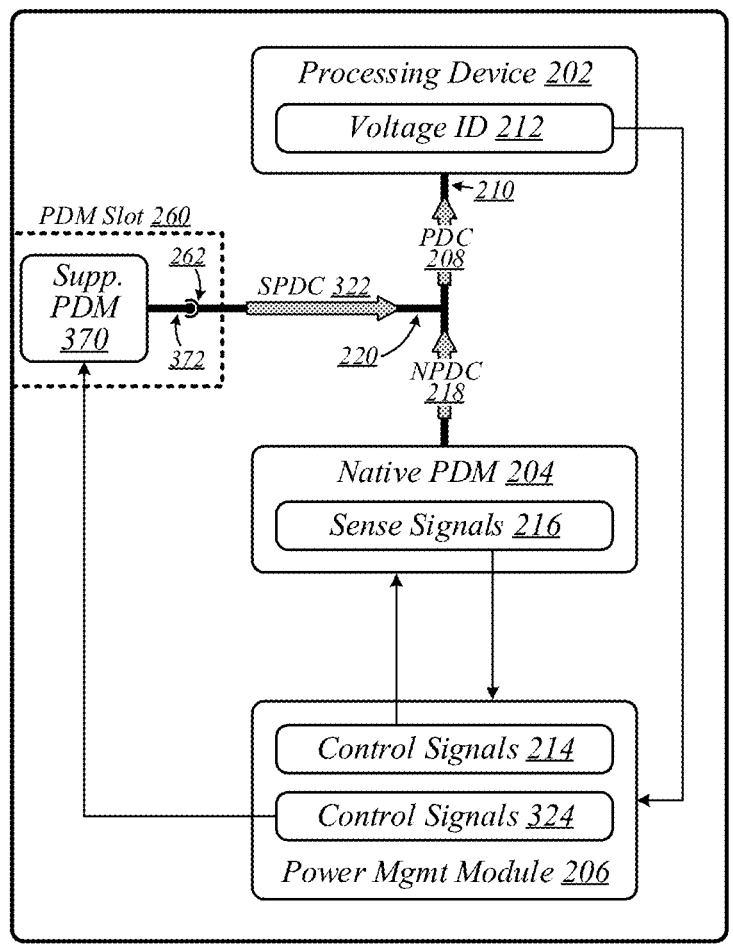
FIG. 3 illustrates an embodiment of a first operating environment.

FIG. 3 illustrates an operating environment 300 that may be representative of the implementation of one or more of the disclosed modular power delivery techniques according to various embodiments. In operating environment 300, a supplemental power delivery module 370 has been inserted into the PDM slot 260 of apparatus 200 of FIG. 2. Supplemental power delivery module 370 may generally comprise circuitry capable of providing supplemental power to processing device 202 by sourcing a supplemental power delivery current. In some embodiments, supplemental power delivery module 370 may comprise one or more MOSFET drivers, one or more inductors such as a chokes, and one or more capacitors. It is to be appreciated that supplemental power delivery module 370 may additionally or alternatively comprise one or more other components in various embodiments, and the embodiments are not limited to this example.

In some embodiments, supplemental power delivery module 370 may feature a power delivery connector 372 that is conductively coupled with power circuitry comprised in supplemental power delivery module 370. In various embodiments, the insertion of supplemental power delivery module 370 into PDM slot 260 may cause power delivery connector 372 to mate with power delivery connector 262 of apparatus 200, which may link power circuitry of supplemental power delivery module 370 with power circuitry of apparatus 200. In some embodiments, the mating of power delivery connector 372 with power delivery connector 262 may conductively couple power circuitry of supplemental power delivery module 370 with power delivery line 210, via supplemental power delivery line 220. In various embodiments, the insertion of supplemental power delivery module 370 into PDM slot 260 may also establish a link between supplemental power delivery module 370 and power management module 206 via the supplemental control line 264 depicted in FIG. 2 (not depicted in FIG. 3). The embodiments are not limited in this context.

In some embodiments, linking power circuitry of supplemental power delivery module 370 with power circuitry of apparatus 200 may enable supplemental power delivery module 370 to source a supplemental power delivery current (SPDC) 322. In various embodiments, supplemental power delivery module 370 may source supplemental power delivery current 322 via supplemental power delivery line 220. In some embodiments, supplemental power delivery current 322 may supplement native power delivery current 218 sourced by native power delivery module 204. In various embodiments, at a given point in time, native power delivery current 218 may supply a portion of the power delivery current 208 drawn by processing device 202, and supplemental power delivery current 322 may supply the remainder of the power delivery current 208 drawn by processing device 202. In some embodiments, supplemental power delivery module 370 may provide one or more additional power phases for the power delivered to processing device 202. The embodiments are not limited in this context.

In various embodiments, following insertion of supplemental power delivery module 370 into PDM slot 260, one or more operating parameter settings of processing device 202 may be dynamically reprogrammed. In some embodiments, a power delivery load line setting of processing device 202 may be dynamically reprogrammed to account for a change in the power delivery load line due to the presence of supplemental power delivery module 370. In various embodiments, a power delivery current limit setting of processing device 202 may be dynamically reprogrammed to account for the availability of additional power delivery current due to the presence of supplemental power delivery module 370. In some embodiments, a power consumption limit setting for processing device 202 may be dynamically reprogrammed to account for the availability of additional power due to the presence of supplemental power delivery module 370. The embodiments are not limited to these examples.

In various embodiments, power management module 206 may be operative to regulate the input voltage of processing device 202 by controlling both native power delivery module 204 and supplemental power delivery module 370. In some embodiments, power management module 206 may be operative to control native power delivery module 204 by sending control signals 214 to native power delivery module 204. In various embodiments, power management module 206 may be operative to control supplemental power delivery module 370 by sending control signals 324 to supplemental power delivery module 370. The embodiments are not limited in this context.

In some embodiments, supplemental power delivery module 370 may be capable of sourcing up to a maximum amount $SPDC_{max}$ of power delivery current. In various embodiments, when supplemental power delivery module 370 is present in PDM slot 260, the maximum amount $PDC_{max}$ of power delivery current that can be provided to processing device 202 may be equal to the sum of $SPDC_{max}$ and the maximum amount $NPDC_{max}$ of power delivery current that native power delivery module 204 is capable of sourcing. In some embodiments, $NPDC_{max}$ may be less than $I_{max}$, such that some higher-performance operational states would be unavailable to processing device 202 if it could draw power delivery current only from native power delivery module 204. However, in various embodiments, due to the availability of an additional amount of up to $SPDC_{max}$ of power delivery current from supplemental power delivery module 370, $PDC_{max}$ may be large enough to make some or all such higher-performance operational states available to processing device 202. The embodiments are not limited in this context.

In some embodiments, a particular physical structure may be defined/specified for supplemental power delivery modules that are to be accommodated by PDM slot 260. In various embodiments, apparatus 200 may be designed to tolerate some degree of variation with respect to one or more characteristics of supplemental power delivery modules that may be inserted into PDM slot 260. In some embodiments, apparatus 200 may be designed such that it is capable of accepting power from supplemental power delivery modules featuring any one of multiple $SPDC_{max}$ values. In various embodiments, for example, apparatus 200 may be designed such that it is compatible with 3A, 6A, 9A, and 12A supplemental power delivery modules. The embodiments are not limited to this example.

It is worthy of note that in some embodiments, apparatus 200 may be designed such that a power delivery module inserted in PDM slot 260 serves as a replacement for native power delivery module 204, rather than serving to supplement the current-sourcing capabilities of native power delivery module 204. In various embodiments, following insertion of such a replacement power delivery module into PDM slot 260, native power delivery module 204 may no longer be used to source power delivery current for processing device 202, and power delivery current 208 may be drawn entirely from the replacement power delivery module. In some embodiments, following insertion of such a replacement power delivery module into PDM slot 260, circuitry of apparatus 200 may be operative to "switch off" the current flow out of native power delivery module 204 and/or electrically isolate native power delivery module 204 from processing device 202. In various embodiments, such a replacement power delivery module may be capable of sourcing up to a maximum amount $RPDC_{max}$ of power delivery current, and the maximum amount $PDC_{max}$ of power delivery current that can be provided to processing device 202 may be equal to $RPDC_{max}$. In some embodiments, replacing native power delivery module 204 with a replacement power delivery module for which the associated $RPDC_{max}$ is greater than $NPDC_{max}$ may render one or more previously unavailable power/performance states available to processing device 202. The embodiments are not limited in this context.

Figure 4:
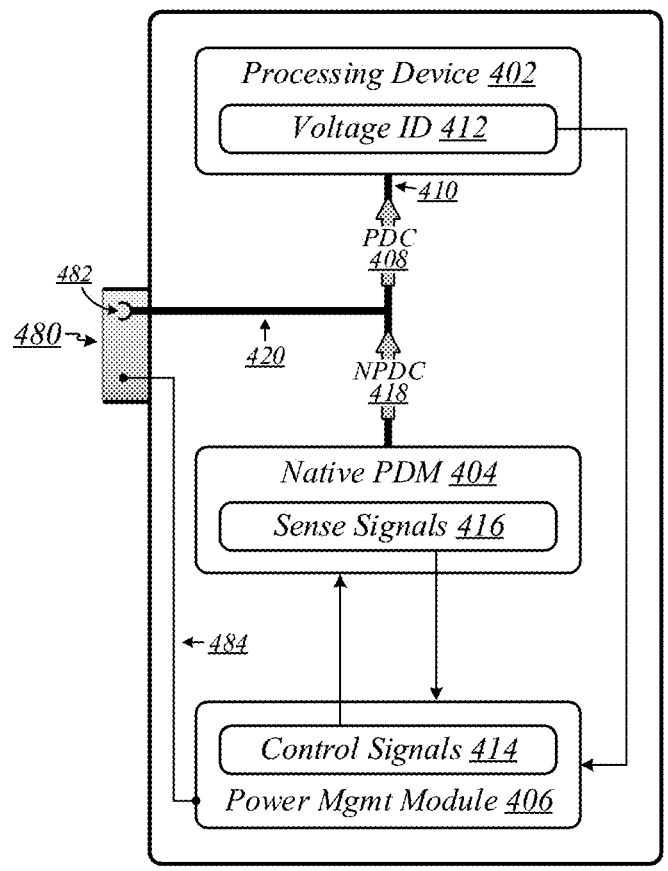
FIG. 4 illustrates an embodiment of an apparatus having a power deliver module connector and an external power delivery module.
Figure 4:
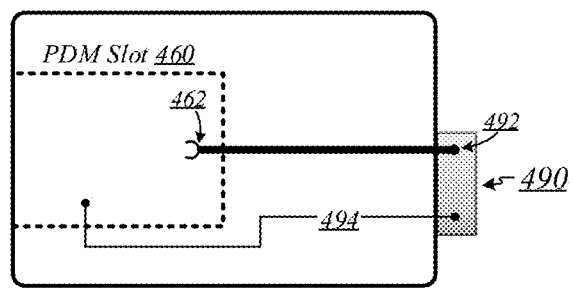

FIG. 4 illustrates an apparatus 400 that may be representative of the implementation of one or more of the disclosed modular power delivery techniques according to various embodiments. Apparatus 400 may generally be representative of a portable electronic device. In some embodiments, apparatus 400 may be representative of a portable communication device, such as a mobile phone. In various other embodiments, apparatus 400 may be representative of a portable computing device, such as a laptop computer, tablet computer, "2-in-1" laptop-tablet hybrid, or another type of portable computing device. In still other embodiments, apparatus 400 may be representative of another type of portable electronic device, such as a digital camera or a portable media player. The embodiments are not limited to these examples.

As shown in FIG. 4, apparatus 400 may comprise a processing device 402, a native power delivery module (PDM) 404, a power management module 406, and an interface connector 480. Processing device 402 may generally comprise an electronic device, such as an integrated circuit, that features processing circuitry/capabilities. In some embodiments, processing device 402 may draw power delivery current 408 from a power delivery line 410. In various embodiments, processing device 402 may comprise a processor or logic device. In some other embodiments, processing device 402 may comprise an SoC, or another type of device featuring processing circuitry/capabilities. Examples of processing device 402 may include—without limitation—any of the examples mentioned above in reference to processing device 202 of FIG. 2. The embodiments are not limited in this context.

Native power delivery module 404 may generally comprise built-in circuitry of apparatus 400. In various embodiments, native power delivery module 404 may comprise circuitry configured to provide power to processing device 402 by sourcing a native power delivery current (NPDC) 418. In some embodiments, native power delivery module 404 may comprise one or more MOSFETs, one or more MOSFET drivers, one or more inductors such as a chokes, and one or more capacitors. It is to be appreciated that native power delivery module 404 may additionally or alternatively comprise one or more other components in various embodiments, and the embodiments are not limited to this example.

Power management module 406 may generally be operative to regulate an input voltage of processing device 402. In some embodiments, power management module 406 may comprise a voltage regulator controller. In various embodiments, power management module 406 may comprise a power management integrated circuit (PMIC). In some embodiments, power management module 406 may be operative to read a voltage identifier (ID) 412 from voltage ID pins of processing device 402 in order to identify a required voltage level and regulate the input voltage of processing device 402 to maintain it at (at least approximately) the required voltage level. In various embodiments, power management module 406 may be operative to monitor the input voltage level of processing device 402 based on sense signals 416 received from/via native power delivery module 404.

In some embodiments, the behavior of processing device 402 during ongoing operation may generally depend on one or more operating parameter settings of processing device 402. In various embodiments, the one or more operating parameter settings may include a power delivery load line setting, which may be set to substantially match a load line of the power delivery circuitry that powers processing device 402. In some embodiments, the one or more operating parameter settings may include a power delivery current limit setting, which may be set to designate a limit on the amount of power delivery current that processing device 402 is to draw. In various embodiments, the one or more operating parameter setting may include a power consumption limit setting, which may be set to designate a limit on the operating power of processing device 402. In some such embodiments, the power consumption limit setting may be set to designate a highest available/permissible power state for processing device 402. The embodiments are not limited to these examples.

In various embodiments, the aforementioned one or more operating parameter settings may include one or more dynamically programmable operating parameter settings. In some embodiments, processing device 402 may feature a dynamically programmable power delivery load line setting. In various embodiments, processing device 402 may feature a dynamically programmable power delivery current limit setting. In some embodiments, processing device 402 may feature a dynamically programmable power consumption limit setting. The embodiments are not limited to these examples.

Interface connector 480 may generally comprise a port, slot, receptacle, coupling, interface, or other feature designed to enable apparatus 400 to interface with one or more types of electronic devices. In various embodiments, for example, mating interface connector 480 with a counterpart connector at a docking station may establish an interface between apparatus 400 and the docking station, thereby enabling apparatus 400 to utilize one or more features/capabilities of the docking station. In some embodiments, interface connector 480 may comprise a power delivery connector 482. In various embodiments, power delivery connector 482 may be designed/situated in such fashion that when interface connector 480 mates with a counterpart connector of another device, power delivery connector 482 mates with a counterpart power delivery connector of the other device. In some embodiments, power delivery connector 482 may be conductively coupled with power delivery line 410 via a supplemental power delivery line 420. In various embodiments, apparatus 400 may comprise a supplemental control line 484. In some embodiments, supplemental control line 484 may be designed/situated in such fashion that when interface connector 480 mates with a counterpart connector of another device, supplemental control line 484 becomes conductively coupled with a control line of that other device. The embodiments are not limited in this context.

In various embodiments, when apparatus 400 operates in a stand-alone fashion such that it is not connected with another device via interface connector 480, all of the power delivery current 408 drawn by processing device 402 may be sourced by native power delivery module 404, such that power delivery current 408 is the same as native power delivery current 418. In some embodiments, when apparatus 400 operates in a stand-alone fashion, power management module 406 may be operative to regulate the input voltage of processing device 402 by controlling native power delivery module 404 using control signals 414 that it sends to native power delivery module 404. In various embodiments, when apparatus 400 operates in a stand-alone fashion, a power delivery load line setting for processing device 402 may be set to substantially match a load line of native power delivery module 404. In some embodiments, when apparatus 400 operates in a stand-alone fashion, a power delivery current limit setting for processing device 402 may be set based on the amount of power delivery current that can be sourced by native power delivery module 404. In various embodiments, when apparatus 400 operates in a stand-alone fashion, a power consumption limit setting for processing device 402 may be set based on the amount of power that can be delivered by native power delivery module 404. The embodiments are not limited in this context.

In some embodiments, native power delivery module 404 may be capable of sourcing up to a maximum amount $NPDC_{max}$ of power delivery current, and processing device 402 may be able to accept/use up to a maximum amount $I_{max}$ of power delivery current. In various embodiments, native power delivery module 404 may be designed to provide relatively basic current-sourcing capabilities, and $NPDC_{max}$ may thus be relatively low. In various embodiments, native power delivery module 404 may comprise power delivery circuitry for only a single power phase. In some/var embodiments, $NPDC_{max}$ may be less than $I_{max}$, such that the maximum amount of power that native power delivery module 404 is capable of delivering is less than the maximum amount of power that processing device 402 can use. In some embodiments, some higher-performance operational states may therefore be unavailable to processing device 402 when it can draw power delivery current only from native power delivery module 404. The embodiments are not limited in this context.

FIG. 4 also illustrates an apparatus 450 that may be representative of the implementation of one or more of the disclosed modular power delivery techniques according to various embodiments. Apparatus 450 may generally be representative of an electronic device with which apparatus 400 may be able to interface, via interface connector 480. In some embodiments, apparatus 450 may comprise an electronic device designed to be used as an accessory for apparatus 400 and/or similar devices. In various embodiments, for example, apparatus 450 may comprise a docking station designed to be compatible with apparatus 400. The embodiments are not limited to this example.

As shown in FIG. 4, apparatus 450 may comprise a PDM slot 460 and an interface connector 490. PDM slot 460 may generally comprise a slot, port, receptacle, coupling, interface, or other feature designed to accept a supplemental power delivery module. Interface connector 490 may generally comprise a port, slot, receptacle, coupling, interface, or other feature designed to enable apparatus 450 to interface with one or more types of electronic devices. In some embodiments, interface connector 490 may comprise a counterpart connector for interface connector 480 of apparatus 400, such that interface connector 490 is capable of mating with interface connector 480. In various embodiments, interface connector 490 may comprise a power delivery connector 492 that is designed to mate with power delivery connector 482 when interface connector 490 mates with interface connector 480. In some embodiments, power delivery connector 492 may be conductively coupled with a power delivery connector 462. In various embodiments, power delivery connector 462 may be designed/situated in such fashion that when a supplemental power delivery module is inserted into PDM slot 460, power delivery connector 462 mates with a counterpart power delivery connector of the supplemental power delivery module. In some embodiments, apparatus 450 may comprise a supplemental control line 494. In various embodiments, supplemental control line 494 may be designed/situated in such fashion that when a supplemental power delivery module is inserted into PDM slot 460, supplemental control line 494 is conductively coupled with one or more control lines or pins of that supplemental power delivery module. The embodiments are not limited in this context.

Figure 5:
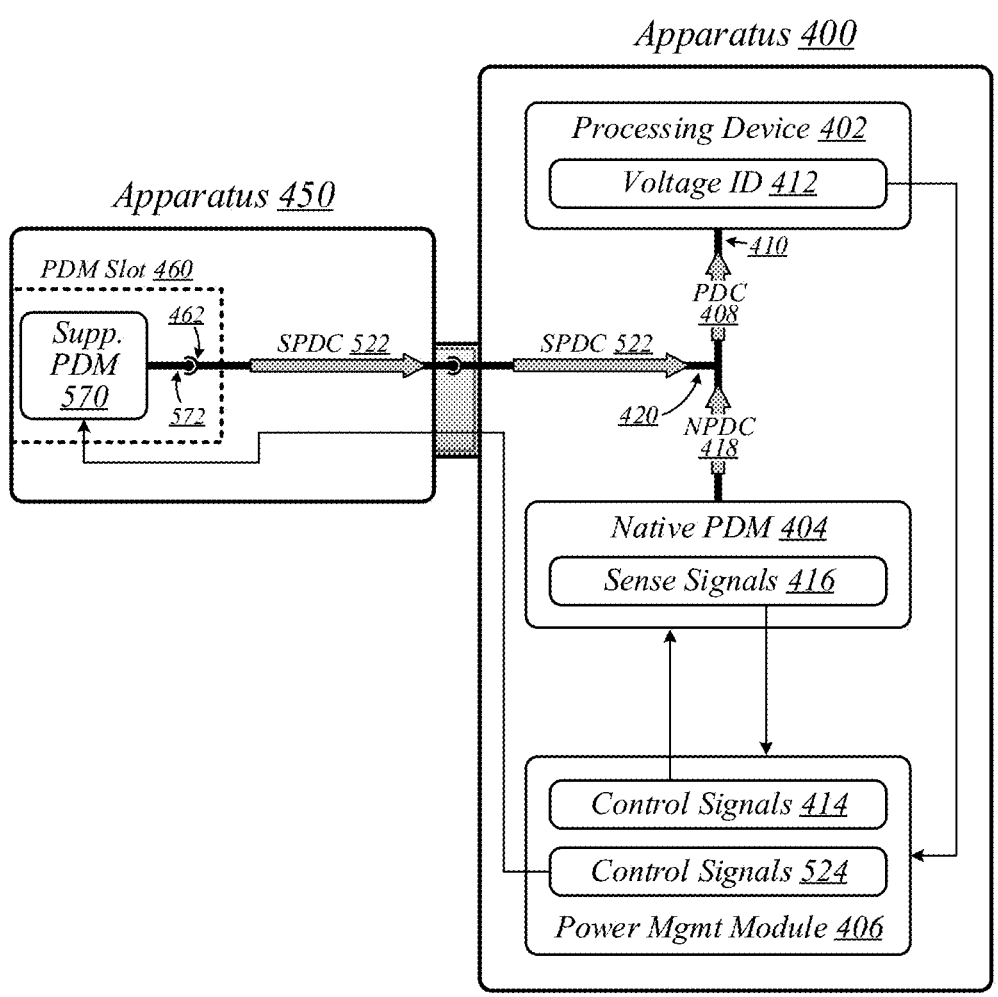
FIG. 5 illustrates an embodiment of the apparatus of FIG. 4 coupled to the external power delivery module.

FIG. 5 illustrates an operating environment 500 that may be representative of the implementation of one or more of the disclosed modular power delivery techniques according to some embodiments. In operating environment 500, interface connector 480 of apparatus 400 has been mated with interface connector 490 of apparatus 450, and a supplemental power delivery module 570 has been inserted into the PDM slot 460 of apparatus 450. Supplemental power delivery module 570 may generally comprise circuitry capable of providing supplemental power to processing device 402 by sourcing a supplemental power delivery current. In various embodiments, supplemental power delivery module 570 may comprise one or more MOSFET drivers, one or more inductors such as a chokes, and one or more capacitors. It is to be appreciated that supplemental power delivery module 570 may additionally or alternatively comprise one or more other components in some embodiments, and the embodiments are not limited to this example.

In various embodiments, supplemental power delivery module 570 may feature a power delivery connector 572 that is conductively coupled with power circuitry comprised in supplemental power delivery module 570. In some embodiments, the insertion of supplemental power delivery module 570 into PDM slot 460 may cause power delivery connector 570 to mate with power delivery connector 462 of apparatus 450, which may link power circuitry of supplemental power delivery module 570 with power circuitry of apparatus 400 via the interface between apparatus 450 and apparatus 400. In various embodiments, the mating of power delivery connector 572 with power delivery connector 462 may conductively couple power circuitry of supplemental power delivery module 570 with power delivery line 410, first via the interface between apparatus 450 and apparatus 400, and then via supplemental power delivery line 420. In some embodiments, the insertion of supplemental power delivery module 570 into PDM slot 460 may also establish a link between supplemental power delivery module 570 and power management module 406 via the supplemental control lines 494 and 484 depicted in FIG. 4 (not depicted in FIG. 5). The embodiments are not limited in this context.

In various embodiments, linking power circuitry of supplemental power delivery module 570 with power circuitry of apparatus 400 via the interface between apparatus 450 and apparatus 400 may enable supplemental power delivery module 570 to source a supplemental power delivery current (SPDC) 522. In some embodiments, supplemental power delivery current 522 may supplement native power delivery current 418 sourced by native power delivery module 404. In various embodiments, at a given point in time, native power delivery current 418 may supply a portion of the power delivery current 408 drawn by processing device 402, and supplemental power delivery current 522 may supply the remainder of the power delivery current 408 drawn by processing device 402. In some embodiments, supplemental power delivery module 570 may provide one or more additional power phases for the power delivered to processing device 402. The embodiments are not limited in this context.

In various embodiments, following insertion of supplemental power delivery module 570 into PDM slot 460 of apparatus 450 and mating of interface connector 480 of apparatus 400 with interface connector 490 of apparatus 450, one or more operating parameter settings of processing device 402 may be dynamically reprogrammed. In some embodiments, a power delivery load line setting of processing device 402 may be dynamically reprogrammed to account for a change in the power delivery load line due to the linkage of power circuitry of supplemental power delivery module 570 with power circuitry of apparatus 400. In various embodiments, a power delivery current limit setting of processing device 402 may be dynamically reprogrammed to account for the availability of additional power delivery current due to the linkage of power circuitry of supplemental power delivery module 570 with power circuitry of apparatus 400. In some embodiments, a power consumption limit setting for processing device 402 may be dynamically reprogrammed to account for the availability of additional power due to the linkage of power circuitry of supplemental power delivery module 570 with power circuitry of apparatus 400. The embodiments are not limited to these examples.

In various embodiments, power management module 406 may be operative to regulate the input voltage of processing device 402 by controlling both native power delivery module 404 and supplemental power delivery module 570. In some embodiments, power management module 406 may be operative to control native power delivery module 404 by sending control signals 414 to native power delivery module 404. In various embodiments, power management module 406 may be operative to control supplemental power delivery module 570 by sending control signals 524 to supplemental power delivery module 570. The embodiments are not limited in this context.

In some embodiments, supplemental power delivery module 570 may be capable of sourcing up to a maximum amount $SPDC_{max}$ of power delivery current. In various embodiments, when supplemental power delivery module 570 is present in PDM slot 460, the maximum amount $PDC_{max}$ of power delivery current that can be provided to processing device 402 may be equal to the sum of $SPDC_{max}$ and the maximum amount $NPDC_{max}$ of power delivery current that native power delivery module 404 is capable of sourcing. In some embodiments, $NPDC_{max}$ may be less than $I_{max}$, such that some higher-performance operational states would be unavailable to processing device 402 if it could draw power delivery current only from native power delivery module 404. However, in various embodiments, due to the availability of an additional amount of up to $SPDC_{max}$ of power delivery current from supplemental power delivery module 570, $PDC_{max}$ may be large enough to make some or all such higher-performance operational states available to processing device 402. The embodiments are not limited in this context.

In some embodiments, a particular physical structure may be defined/specified for supplemental power delivery modules that are to be accommodated by PDM slot 460 of apparatus 450. In various embodiments, apparatus 400 may be designed to tolerate some degree of variation with respect to one or more characteristics of supplemental power delivery modules that may be inserted into PDM slot 460 of apparatus 450. In some embodiments, apparatus 400 may be designed such that it is capable of accepting power from supplemental power delivery modules featuring any one of multiple $SPDC_{max}$ values. In various embodiments, for example, apparatus 400 may be designed such that it is compatible with 3A, 6A, 9A, and 12A supplemental power delivery modules. The embodiments are not limited to this example.

It is worthy of note that in some embodiments, apparatuses 400 and 450 may be designed such that while they are connected via mated interface connections 480 and 490, a power delivery module inserted in PDM slot 460 of apparatus 450 serves as a replacement for native power delivery module 404 of apparatus 400, rather than serving to supplement the current-sourcing capabilities of native power delivery module 404. In various embodiments, following connection of apparatuses 400 and 450 via mated interface connections 480 and 490 and insertion of a replacement power delivery module into PDM slot 460 of apparatus 450, native power delivery module 404 of apparatus 400 may no longer be used to source power delivery current for processing device 402, and power delivery current 408 may be drawn entirely from the replacement power delivery module. In some embodiments, following mating of interface connections 480 and 490 and insertion of a replacement power delivery module into PDM slot 460 of apparatus 450, circuitry of apparatus 400 may be operative to "switch off" the current flow out of native power delivery module 404 and/or electrically isolate native power delivery module 404 from processing device 402. In various embodiments, such a replacement power delivery module may be capable of sourcing up to a maximum amount $RPDC_{max}$ of power delivery current, and the maximum amount $PDC_{max}$ of power delivery current that can be provided to processing device 402 may be equal to $RPDC_{max}$. In some embodiments, replacing native power delivery module 404 with a replacement power delivery module for which the associated $RPDC_{max}$ is greater than $NPDC_{max}$ may render one or more previously unavailable power/performance states available to processing device 402. The embodiments are not limited in this context.

Figure 6:
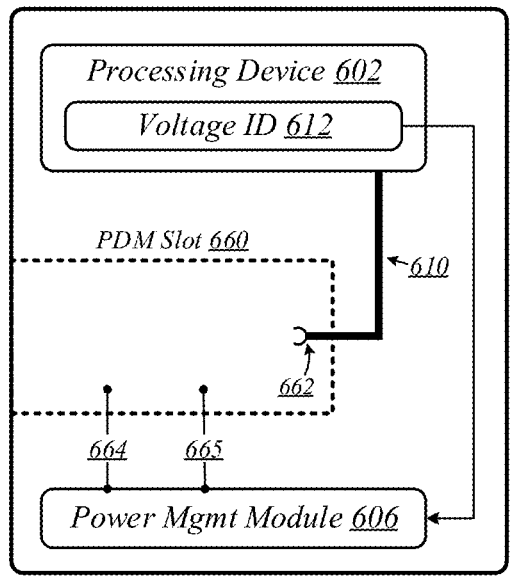
FIG. 6 illustrates an embodiment of another apparatus having a power deliver module slot.

FIG. 6 illustrates an apparatus 600 that may be representative of the implementation of one or more of the disclosed modular power delivery techniques according to various embodiments. Apparatus 600 may generally be representative of an electronic device. Examples of types of electronic devices of which apparatus 600 may be representative in some embodiments may include—without limitation—any of the examples mentioned above in reference to apparatus 200 of FIG. 2 and apparatus 400 of FIG. 4. As shown in FIG. 6, apparatus 600 may comprise a processing device 602, a power management module 606, and a PDM slot 660. Processing device 602 may generally comprise an electronic device, such as an integrated circuit, that features processing circuitry/capabilities. In some embodiments, processing device 602 may be configured to operate using power delivery current drawn via a power delivery line 610. In various embodiments, processing device 602 may comprise a processor or logic device. In some other embodiments, processing device 602 may comprise an SoC, or another type of device featuring processing circuitry/capabilities. Examples of processing device 602 may include—without limitation—any of the examples mentioned above in reference to processing device 202 of FIG. 2 and processing device 402 of FIG. 4. The embodiments are not limited in this context.

Power management module 606 may generally be configured to regulate an input voltage of processing device 602. In various embodiments, power management module 606 may comprise a voltage regulator controller. In some embodiments, power management module 606 may comprise a power management integrated circuit (PMIC). In various embodiments, during operation of processing device 602, power management module 606 may be operative to read a voltage identifier (ID) 612 from voltage ID pins of processing device 602. In some embodiments, based on the voltage ID 612, power management module 606 may identify a required voltage level and regulate the input voltage of processing device 602 to maintain it at (at least approximately) that required voltage level. The embodiments are not limited in this context.

In various embodiments, the behavior of processing device 602 during ongoing operation may generally depend on one or more operating parameter settings of processing device 602. In some embodiments, the one or more operating parameter settings may include a power delivery load line setting, which may be set to substantially match a load line of the power delivery circuitry that powers processing device 602. In various embodiments, the one or more operating parameter settings may include a power delivery current limit setting, which may be set to designate a limit on the amount of power delivery current that processing device 602 is to draw. In some embodiments, the one or more operating parameter setting may include a power consumption limit setting, which may be set to designate a limit on the operating power of processing device 602. In various such embodiments, the power consumption limit setting may be set to designate a highest available/permissible power state for processing device 602. The embodiments are not limited to these examples.

In some embodiments, the aforementioned one or more operating parameter settings may include one or more dynamically programmable operating parameter settings. In various embodiments, processing device 602 may feature a dynamically programmable power delivery load line setting. In some embodiments, processing device 602 may feature a dynamically programmable power delivery current limit setting. In various embodiments, processing device 602 may feature a dynamically programmable power consumption limit setting. The embodiments are not limited to these examples.

PDM slot 660 may generally comprise a slot, port, receptacle, coupling, interface, or other feature designed to accept a power delivery module capable of sourcing power delivery current to enable processing device 602 to operate. In some embodiments, apparatus 600 may comprise a power delivery connector 662, which may be conductively coupled to power delivery line 610. In various embodiments, power delivery connector 662 may be designed/situated in such fashion that when a power delivery module is inserted into PDM slot 660, power delivery connector 662 mates with a counterpart power delivery connector of the power delivery module. In some embodiments, apparatus 600 may comprise a control line 664. In various embodiments, control line 664 may be designed/situated in such fashion that when a power delivery module is inserted into PDM slot 660, power management module 606 can send control signals to the power delivery module via control line 664. In some embodiments, apparatus 600 may comprise a sense line 665. In various embodiments, sense line 665 may be designed/situated in such fashion that as a power delivery module in PDM slot 660 sources power delivery current to power processing device 602, power management module 606 can monitor the input voltage level of processing device 602 based on sense signals received via sense line 665. In some embodiments, when no power delivery module is present in PDM slot 660, processing device 602 may have to access to power, and thus may be unable to operate. The embodiments are not limited in this context.

Figure 7:
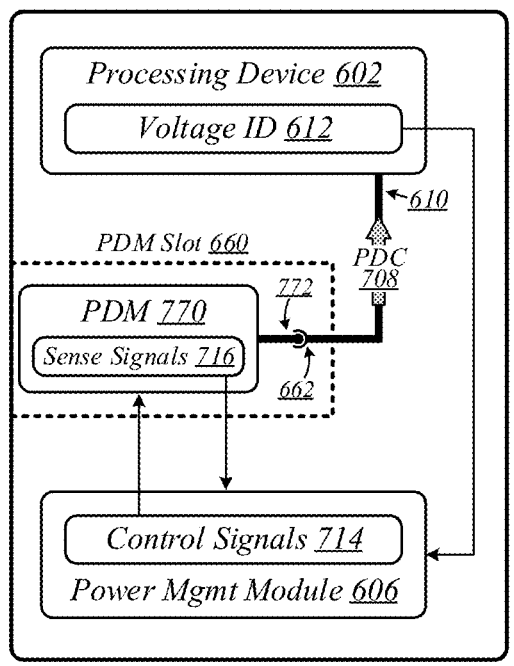
FIG. 7 illustrates an embodiment of the apparatus of FIG. 6 and a power delivery module inserted in the slot.

FIG. 7 illustrates an operating environment 700 that may be representative of the implementation of one or more of the disclosed modular power delivery techniques according to various embodiments. In operating environment 700, a power delivery module 770 has been inserted into the PDM slot 660 of apparatus 600 of FIG. 6. Power delivery module 770 may generally comprise circuitry capable of providing power to processing device 602 by sourcing a power delivery current. In some embodiments, power delivery module 770 may comprise one or more MOSFET drivers, one or more inductors such as a chokes, and one or more capacitors. It is to be appreciated that power delivery module 770 may additionally or alternatively comprise one or more other components in various embodiments, and the embodiments are not limited to this example.

In some embodiments, power delivery module 770 may feature a power delivery connector 772 that is conductively coupled with power circuitry comprised in power delivery module 770. In various embodiments, the insertion of power delivery module 770 into PDM slot 660 may cause power delivery connector 772 to mate with power delivery connector 662 of apparatus 600. In some embodiments, the mating of power delivery connector 772 with power delivery connector 662 may conductively couple power circuitry of power delivery module 770 with power delivery line 610. In various embodiments, the insertion of power delivery module 770 into PDM slot 660 may establish a link between power delivery module 770 and power management module 606 via the control line 664 depicted in FIG. 6 (not depicted in FIG. 7). The embodiments are not limited in this context.

In some embodiments, linking power circuitry of power delivery module 770 with power delivery line 610 may enable power delivery module 770 to provide power to processing device 602 by sourcing a power delivery current (PDC) 708. In various embodiments, power management module 606 may be operative to regulate the input voltage of processing device 602 by controlling power delivery module 770 as it sources power delivery current 708. In some embodiments, power management module 606 may be operative to control power delivery module 770 by sending control signals 714 to power delivery module 770. In various embodiments, power management module 606 may be operative to send control signals 714 to power delivery module 770 via the control line 664 depicted in FIG. 6 (not depicted in FIG. 7). In some embodiments, power management module 606 may be operative to monitor the input voltage level of processing device 602 based on sense signals 716 received from/via power delivery module 770. In various embodiments, power management module 606 may receive sense signals 716 via the sense line 665 depicted in FIG. 6 (not depicted in FIG. 7). The embodiments are not limited in this context.

In some embodiments, following insertion of power delivery module 770 into PDM slot 660, one or more operating parameter settings of processing device 602 may be dynamically reprogrammed. In various embodiments, a power delivery load line setting of processing device 602 may be dynamically reprogrammed to account for a change in the power delivery load line due to the presence of power delivery module 770. In some embodiments, a power delivery current limit setting of processing device 602 may be dynamically reprogrammed to account for the availability of additional power delivery current due to the presence of power delivery module 770. In various embodiments, a power consumption limit setting for processing device 602 may be dynamically reprogrammed to account for the availability of additional power due to the presence of power delivery module 770. The embodiments are not limited to these examples.

In some embodiments, a particular physical structure may be defined/specified for power delivery modules that are to be accommodated by PDM slot 660. In various embodiments, apparatus 600 may be designed to tolerate some degree of variation with respect to one or more characteristics of power delivery modules that may be inserted into PDM slot 660. In some embodiments, apparatus 600 may be designed such that it is capable of accepting power from power delivery modules featuring any one of multiple $PDC_{max}$ values. In various embodiments, for example, apparatus 200 may be designed such that it is compatible with 3A, 6A, 9A, and 12A power delivery modules. The embodiments are not limited to this example.

Figure 8:
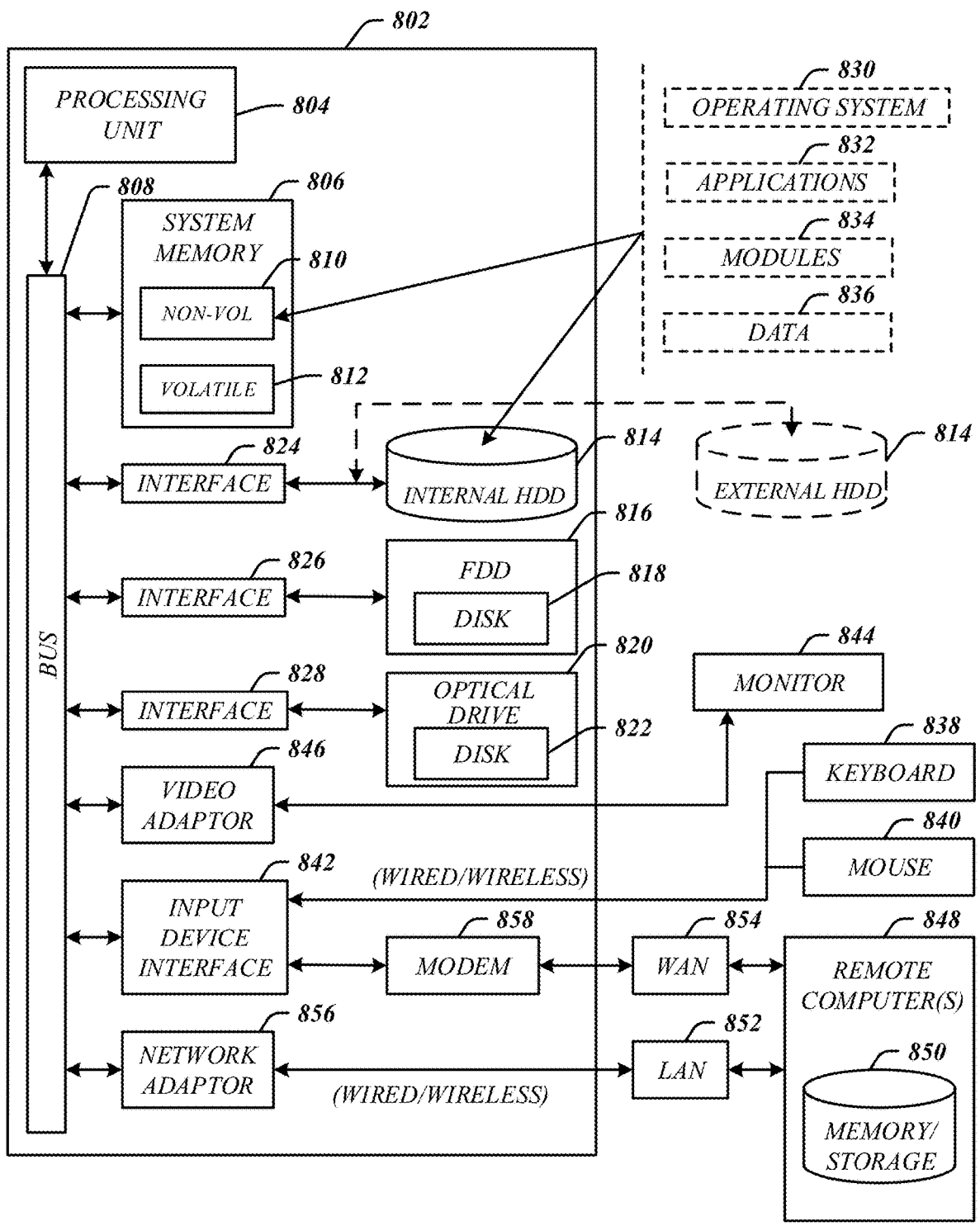

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a computing device that comprises apparatus 200 of FIG. 2, apparatus 400 or apparatus 450 of FIG. 4, or apparatus 600 of FIG. 6. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, according to computing architecture 800, a computer 802 comprises a processing unit 804, a system memory 806 and a system bus 808. In some embodiments, computer 802 may comprise a server. In some embodiments, computer 802 may comprise a client. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
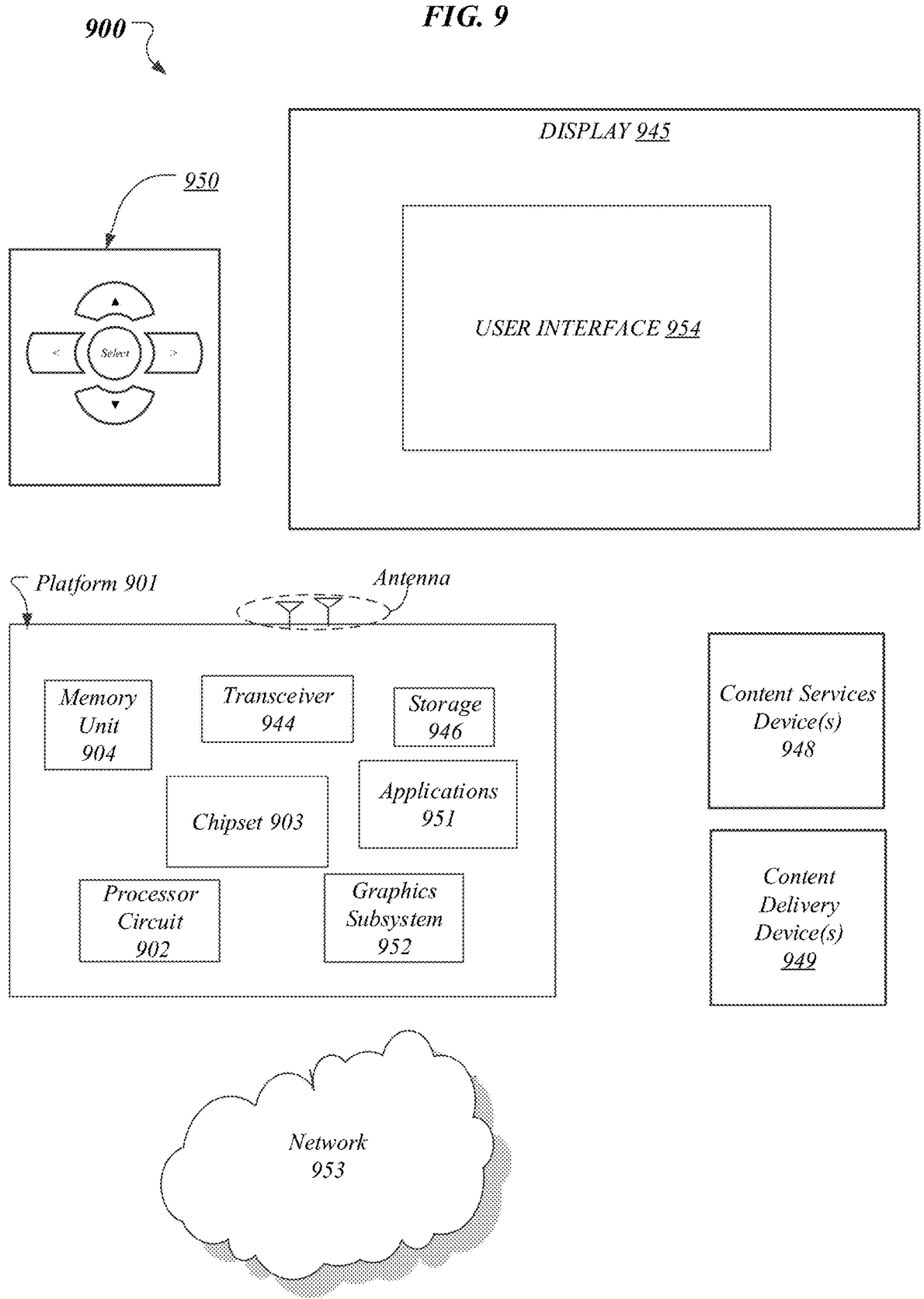

FIG. 9 illustrates an embodiment of a system 900. In various embodiments, system 900 may be representative of a system or architecture that is realized according to one or more techniques described herein, such as a system or architecture that is implemented using one or more of apparatus 200 of FIG. 2, apparatus 400 or apparatus 450 of FIG. 4, apparatus 600 of FIG. 6, and computing architecture 800 of FIG. 8. The embodiments are not limited in this respect.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 includes a platform 901 coupled to a display 945. Platform 901 may receive content from a content device such as content services device(s) 948 or content delivery device(s) 949 or other similar content sources. A navigation controller 950 including one or more navigation features may be used to interact with, for example, platform 901 and/or display 945. Each of these components is described in more detail below.

In embodiments, platform 901 may include any combination of a processor circuit 902, chipset 903, memory unit 904, transceiver 944, storage 946, applications 951, and/or graphics subsystem 952. Chipset 903 may provide intercommunication among processor circuit 902, memory unit 904, transceiver 944, storage 946, applications 951, and/or graphics subsystem 952. For example, chipset 903 may include a storage adapter (not depicted) capable of providing intercommunication with storage 946.

Processor circuit 902 may be implemented using any processor or logic device, and may be the same as or similar to processing unit 804 of FIG. 8. Memory unit 904 may be implemented using any machine-readable or computer-readable media capable of storing data, and may be the same as or similar to system memory 806 of FIG. 8. Transceiver 944 may include one or more radios capable of transmitting and receiving signals using various suitable wireless communications techniques. Display 945 may include any television type monitor or display, and may be the same as or similar to monitor 844 of FIG. 8. Storage 946 may be implemented as a non-volatile storage device, and may be the same as or similar to HDD 814 of FIG. 8.

Graphics subsystem 952 may perform processing of images such as still or video for display. Graphics subsystem 952 may be a graphics processing unit (GPU) or a visual processing unit (VPU), for example. An analog or digital interface may be used to communicatively couple graphics subsystem 952 and display 945. For example, the interface may be any of a High-Definition Multimedia Interface, DisplayPort, wireless HDMI, and/or wireless HD compliant techniques. Graphics subsystem 952 could be integrated into processor circuit 902 or chipset 903. Graphics subsystem 952 could be a stand-alone card communicatively coupled to chipset 903.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 948 may be hosted by any national, international and/or independent service and thus accessible to platform 901 via the Internet, for example. Content services device(s) 948 may be coupled to platform 901 and/or to display 945. Platform 901 and/or content services device(s) 948 may be coupled to a network 953 to communicate (e.g., send and/or receive) media information to and from network 953. Content delivery device(s) 949 also may be coupled to platform 901 and/or to display 945.

In embodiments, content services device(s) 948 may include a cable television box, personal computer, network, telephone, Internet enabled devices or appliance capable of delivering digital information and/or content, and any other similar device capable of unidirectionally or bidirectionally communicating content between content providers and platform 901 and/display 945, via network 953 or directly. It will be appreciated that the content may be communicated unidirectionally and/or bidirectionally to and from any one of the components in system 900 and a content provider via network 953. Examples of content may include any media information including, for example, video, music, medical and gaming information, and so forth.

Content services device(s) 948 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 901 may receive control signals from navigation controller 950 having one or more navigation features. The navigation features of navigation controller 950 may be used to interact with a user interface 954, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be echoed on a display (e.g., display 945) by movements of a pointer, cursor, focus ring, or other visual indicators displayed on the display. For example, under the control of software applications 951, the navigation features located on navigation controller 950 may be mapped to virtual navigation features displayed on user interface 954. In embodiments, navigation controller 950 may not be a separate component but integrated into platform 901 and/or display 945. Embodiments, however, are not limited to the elements or in the context shown or described herein.

In embodiments, drivers (not shown) may include technology to enable users to instantly turn on and off platform 901 like a television with the touch of a button after initial boot-up, when enabled, for example. Program logic may allow platform 901 to stream content to media adaptors or other content services device(s) 948 or content delivery device(s) 949 when the platform is turned "off." In addition, chip set 903 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 900 may be integrated. For example, platform 901 and content services device(s) 948 may be integrated, or platform 901 and content delivery device(s) 949 may be integrated, or platform 901, content services device(s) 948, and content delivery device(s) 949 may be integrated, for example. In various embodiments, platform 901 and display 945 may be an integrated unit. Display 945 and content service device(s) 948 may be integrated, or display 945 and content delivery device(s) 949 may be integrated, for example. These examples are not meant to limit the disclosed subject matter.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 901 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
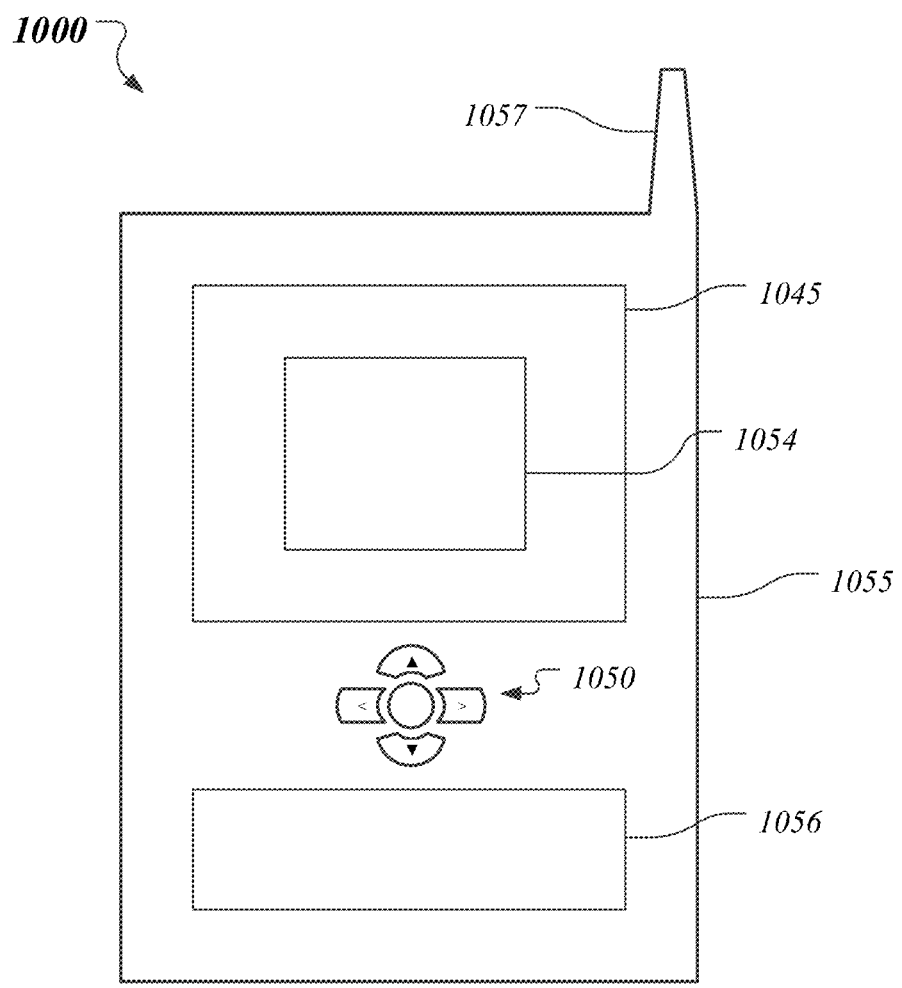
FIG. 10 illustrates an embodiment of a device.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a display 1045, a navigation controller 1050, a user interface 1054, a housing 1055, an I/O device 1056, and an antenna 1057. Display 1045 may include any suitable display unit for displaying information appropriate for a mobile computing device, and may be the same as or similar to display 945 in FIG. 9. Navigation controller 1050 may include one or more navigation features which may be used to interact with user interface 1054, and may be the same as or similar to navigation controller 950 in FIG. 9. I/O device 1056 may include any suitable I/O device for entering information into a mobile computing device. Examples for I/O device 1056 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising native power delivery circuitry to source a native power delivery current, power management circuitry to control the native power delivery circuitry, a power delivery connector to mate with a counterpart power delivery connector of an external device, and a processing device conductively coupled to the power delivery connector via a supplemental power delivery line, the processing device to draw a supplemental power delivery current from the external device via the supplemental power delivery line.

Example 2 is the apparatus of Example 1, the processing device to draw the native power delivery current from the native power delivery circuitry via a power delivery line of the processing device.

Example 3 is the apparatus of Example 2, the processing device to draw the supplemental power delivery current from the external device via the supplemental power delivery line and the power delivery line of the processing device.

Example 4 is the apparatus of any of Examples 1 to 3, the external device to comprise a docking station.

Example 5 is the apparatus of any of Examples 1 to 3, the external device to comprise a supplemental power delivery module.

Example 6 is the apparatus of Example 5, the processing device to draw the supplemental power delivery current from power delivery circuitry of the supplemental power delivery module.

Example 7 is the apparatus of Example 6, the processing device to determine a required input voltage based on a load line of the supplemental power delivery module.

Example 8 is the apparatus of any of Examples 1 to 7, the power management circuitry to regulate an input voltage of the processing device.

Example 9 is the apparatus of any of Examples 1 to 8 the processing device comprising a processor.

Example 10 is the apparatus of any of Examples 1 to 8, the processing device comprising a system-on-a-chip (SoC).

Example 11 is the apparatus of any of Examples 1 to 10, the processing device featuring a dynamically programmable load line setting.

Example 12 is the apparatus of any of Examples 1 to 11, the processing device featuring one or both of a dynamically programmable power delivery current limit setting and a dynamically programmable power consumption limit setting.

Example 13 is a system, comprising an apparatus according to any of Examples 1 to 12, at least one radio frequency (RF) transceiver, and at least one RF antenna.

Example 14 is an apparatus, comprising native power delivery circuitry to source a native power delivery current, power management circuitry to control the native power delivery circuitry, a power delivery connector to mate with a counterpart power delivery connector of a supplemental power delivery module, and a processing device conductively coupled to the power delivery connector via a supplemental power delivery line, the processing device to draw a supplemental power delivery current from power delivery circuitry of the supplemental power delivery module via the supplemental power delivery line.

Example 15 is the apparatus of Example 14, comprising a power delivery module slot to accept the supplemental power delivery module.

Example 16 is the apparatus of any of Examples 14 to 15, the processing device to draw the native power delivery current from the native power delivery circuitry via a power delivery line of the processing device.

Example 17 is the apparatus of Example 16, the processing device to draw the supplemental power delivery current via the supplemental power delivery line and the power delivery line of the processing device.

Example 18 is the apparatus of any of Examples 14 to 17, the power management circuitry to control the native power delivery circuitry and the power delivery circuitry of the supplemental power delivery module.

Example 19 is the apparatus of any of Examples 14 to 18, the processing device to determine a required input voltage based on a load line of the supplemental power delivery module.

Example 20 is the apparatus of any of Examples 14 to 19, the power management circuitry to regulate an input voltage of the processing device.

Example 21 is the apparatus of any of Examples 14 to 20, the processing device comprising a processor.

Example 22 is the apparatus of any of Examples 14 to 20, the processing device comprising a system-on-a-chip (SoC).

Example 23 is the apparatus of any of Examples 14 to 22, the processing device featuring a dynamically programmable load line setting.

Example 24 is the apparatus of any of Examples 14 to 23, the processing device featuring one or both of a dynamically programmable power delivery current limit setting and a dynamically programmable power consumption limit setting.

Example 25 is a system, comprising an apparatus according to any of Examples 14 to 24, at least one radio frequency (RF) transceiver, and at least one RF antenna.

Example 26 is an apparatus, comprising native power delivery circuitry to source a native power delivery current, power management circuitry to control the native power delivery circuitry, a power delivery connector to mate with a counterpart power delivery connector of a docking station, and a processing device conductively coupled to the power delivery connector via a supplemental power delivery line, the processing device to draw a supplemental power delivery current from the docking station via the supplemental power delivery line.

Example 27 is the apparatus of Example 26, the processing device to draw the native power delivery current from the native power delivery circuitry via a power delivery line of the processing device.

Example 28 is the apparatus of Example 27, the processing device to draw the supplemental power delivery current from the docking station via the supplemental power delivery line and the power delivery line of the processing device.

Example 29 is the apparatus of any of Examples 26 to 28, the power management circuitry to regulate an input voltage of the processing device.

Example 30 is the apparatus of any of Examples 26 to 29 the processing device comprising a processor.

Example 31 is the apparatus of any of Examples 26 to 29, the processing device comprising a system-on-a-chip (SoC).

Example 32 is the apparatus of any of Examples 26 to 31, the processing device featuring a dynamically programmable load line setting.

Example 33 is the apparatus of any of Examples 26 to 32, the processing device featuring one or both of a dynamically programmable power delivery current limit setting and a dynamically programmable power consumption limit setting.

Example 34 is a system, comprising an apparatus according to any of Examples 26 to 33, at least one radio frequency (RF) transceiver, and at least one RF antenna.

Example 35 is an apparatus, comprising means for sourcing a native power delivery current for a processing device, means for connecting with a power delivery connector of an external device, and means for conductively coupling the processing device to the power delivery connector of the external device, the processing device to draw a supplemental power delivery current from the external device.

Example 36 is the apparatus of Example 35, the processing device to draw the native power delivery current via a power delivery line of the processing device.

Example 37 is the apparatus of Example 36, the processing device to draw the supplemental power delivery current from the external device via the power delivery line of the processing device.

Example 38 is the apparatus of any of Examples 35 to 37, the external device to comprise a docking station.

Example 39 is the apparatus of any of Examples 35 to 37, the external device to comprise a supplemental power delivery module.

Example 40 is the apparatus of Example 39, the processing device to draw the supplemental power delivery current from power delivery circuitry of the supplemental power delivery module.

Example 41 is the apparatus of Example 40, the processing device to determine a required input voltage based on a load line of the supplemental power delivery module.

Example 42 is the apparatus of any of Examples 35 to 41, comprising means for regulating an input voltage of the processing device.

Example 43 is the apparatus of any of Examples 35 to 42, the processing device comprising a processor.

Example 44 is the apparatus of any of Examples 35 to 42, the processing device comprising a system-on-a-chip (SoC).

Example 45 is the apparatus of any of Examples 35 to 44, the processing device featuring a dynamically programmable load line setting.

Example 46 is the apparatus of any of Examples 35 to 45, the processing device featuring one or both of a dynamically programmable power delivery current limit setting and a dynamically programmable power consumption limit setting.

Example 47 is a system, comprising an apparatus according to any of Examples 35 to 46, at least one radio frequency (RF) transceiver, and at least one RF antenna.

Example 48 is an apparatus, comprising means for sourcing a native power delivery current for a processing device, means for connecting with a power delivery connector of a supplemental power delivery module, and means for conductively coupling the processing device to the power delivery connector of the supplemental power delivery module, the processing device to draw a supplemental power delivery current from power delivery circuitry of the supplemental power delivery module.

Example 49 is the apparatus of Example 48, comprising means for accepting the supplemental power delivery module.

Example 50 is the apparatus of any of Examples 48 to 49, the processing device to draw the native power delivery current via a power delivery line of the processing device.

Example 51 is the apparatus of Example 50, the processing device to draw the supplemental power delivery current via the power delivery line of the processing device.

Example 52 is the apparatus of any of Examples 48 to 51, comprising means for controlling the power delivery circuitry of the supplemental power delivery module.

Example 53 is the apparatus of any of Examples 48 to 52, the processing device to determine a required input voltage based on a load line of the supplemental power delivery module.

Example 54 is the apparatus of any of Examples 48 to 53, comprising means for regulating an input voltage of the processing device.

Example 55 is the apparatus of any of Examples 48 to 54, the processing device comprising a processor.

Example 56 is the apparatus of any of Examples 48 to 54, the processing device comprising a system-on-a-chip (SoC).

Example 57 is the apparatus of any of Examples 48 to 56, the processing device featuring a dynamically programmable load line setting.

Example 58 is the apparatus of any of Examples 48 to 57, the processing device featuring one or both of a dynamically programmable power delivery current limit setting and a dynamically programmable power consumption limit setting.

Example 59 is a system, comprising an apparatus according to any of Examples 48 to 58, at least one radio frequency (RF) transceiver, and at least one RF antenna.

Example 60 is an apparatus, comprising means for sourcing a native power delivery current for a processing device, means for connecting with a power delivery connector of docking station, and means for conductively coupling the processing device to the power delivery connector of the docking station, the processing device to draw a supplemental power delivery current from the docking station.

Example 61 is the apparatus of Example 60, the processing device to draw the native power delivery current via a power delivery line of the processing device.

Example 62 is the apparatus of Example 61, the processing device to draw the supplemental power delivery current from the docking station via the power delivery line of the processing device.

Example 63 is the apparatus of any of Examples 60 to 62, comprising means for regulating an input voltage of the processing device.

Example 64 is the apparatus of any of Examples 60 to 63, the processing device comprising a processor.

Example 65 is the apparatus of any of Examples 60 to 63, the processing device comprising a system-on-a-chip (SoC).

Example 66 is the apparatus of any of Examples 60 to 65, the processing device featuring a dynamically programmable load line setting.

Example 67 is the apparatus of any of Examples 60 to 66, the processing device featuring one or both of a dynamically programmable power delivery current limit setting and a dynamically programmable power consumption limit setting.

Example 68 is a system, comprising an apparatus according to any of Examples 60 to 67, at least one radio frequency (RF) transceiver, and at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a processing device;
   native power delivery circuitry, coupled to the processing device via a power delivery line, the native power delivery circuitry to source a native power delivery current;
   a power delivery connector to mate with a counterpart power delivery connector of an external device, the power delivery connector coupled to the power delivery line via a supplement power delivery line; and
   power management circuitry coupled to the native power delivery circuitry and to the power delivery connector, the power management circuitry to:
      send a first control signal to the native power delivery circuitry to cause the native power delivery circuitry to source the native power delivery current for a portion of a power delivery current to the processing device via the power delivery line;
      send, via the power delivery connector, a second control signal to the external device to cause the external device to source a supplemental current for a portion of the power delivery current to the processing device via the supplemental power delivery line and the power delivery line, and
      send a third control signal to the processing device to dynamically adjust a setting of the processing device to account for a presence of the supplemental current on the power delivery line, the setting comprising at least one of a load line setting a power delivery current limit setting, or a power consumption limit setting.

2. The apparatus of claim 1, the external device to comprise a docking station.

3. The apparatus of claim 1, the external device to comprise a supplemental power delivery module.

4. The apparatus of claim 3, the processing device to draw the supplemental power delivery current from power delivery circuitry of the supplemental power delivery module.

5. The apparatus of claim 4, the processing device to determine a required input voltage based on a load line of the supplemental power delivery module.

6. The apparatus of claim 1, the power management circuitry to regulate an input voltage of the processing device.

7. The apparatus of claim 1, the processing device comprising a processor.

8. The apparatus of claim 1, the processing device comprising a system-on-a-chip (SoC).

9. A system, comprising:
   the apparatus of claim 1;
   at least one radio frequency (RF) transceiver; and
   at least one RF antenna.

10. An apparatus, comprising:
    a processing device;
    native power delivery circuitry, coupled to the processing device via a power delivery line, the native power delivery circuitry to source a native power delivery current;
    a power delivery connector to mate with a counterpart power delivery connector of a supplemental power delivery module of an external device, the power delivery connector coupled to the power delivery line via a supplement power delivery line; and
    power management circuitry coupled to the native power delivery circuitry and to the power delivery connector, the power management circuitry to:
       send a first control signal to the native power delivery circuitry to cause the native power delivery circuitry to source the native power delivery current for a portion of a power delivery current to the processing device via the power delivery line;
       send, via the power delivery connector, a second control signal to the external device to cause the external device to source a supplemental current for a portion of the power delivery current to the processing device via the supplemental power delivery line and the power delivery line, and
       send a third control signal to the processing device to dynamically adjust a setting of the processing device to account for a presence of the supplemental current on the power delivery line, the setting comprising at least one of a load line setting, a power delivery current limit setting, or a power consumption limit setting.

11. The apparatus of claim 10, comprising a power delivery module slot to accept the supplemental power delivery module.

12. The apparatus of claim 10, the processing device to determine a required input voltage based on a load line of the supplemental power delivery module.

13. The apparatus of claim 10, the power management circuitry to regulate an input voltage of the processing device.

14. The apparatus of claim 10, the processing device comprising a processor.

15. The apparatus of claim 10, the processing device comprising a system-on-a-chip (SoC).

16. A system, comprising:
    the apparatus of claim 10;
    at least one radio frequency (RF) transceiver; and
    at least one RF antenna.

* * * * *